United States Patent
Lee (10) Patent No.: US 12,491,927 B2
(45) Date of Patent: Dec. 9, 2025

(54) STEER BY WIRE TYPE STEERING APPARATUS

(71) Applicant: HL Mando Corporation, Pyeongtaek-si (KR)

(72) Inventor: Kwon Ho Lee, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 655 days.

(21) Appl. No.: 17/898,623

(22) Filed: Aug. 30, 2022

(65) Prior Publication Data

US 2023/0064025 A1    Mar. 2, 2023

(30) Foreign Application Priority Data

Aug. 30, 2021 (KR) .......................... 10-2021-0114551

(51) Int. Cl.
*B62D 5/00* (2006.01)

(52) U.S. Cl.
CPC .................................. *B62D 5/001* (2013.01)

(58) Field of Classification Search
CPC ...................................................... B62D 5/001
USPC ........................................................ 180/402
See application file for complete search history.

(56) References Cited

FOREIGN PATENT DOCUMENTS

| | | | |
|---|---|---|---|
| JP | 2016060248 A | * | 4/2016 |
| KR | 102173997 B1 | * | 6/2019 |

* cited by examiner

*Primary Examiner* — Valentin Neacsu
*Assistant Examiner* — Felicia L. Brittman-Alabi
(74) *Attorney, Agent, or Firm* — Hauptman Ham, LLP (57) ABSTRACT

A steer by wire type steering apparatus according to the embodiments of the present disclosure comprises an output shaft provided with fixing grooves on both sides, a moving member which moves in the axial direction when the output shaft is rotated and is provided with a guide portion protruding in the radial direction on an outer circumferential surface, a pair of guide stoppers for guiding the axial movement of the moving member, an elastic ring for elastically supporting the guide stoppers in a radial direction, and housing.

18 Claims, 12 Drawing Sheets

STEER BY WIRE TYPE STEERING APPARATUS

CROSS REFERENCE TO RELATED APPLICATION

This application claims the priority benefit of Republic of Korea Patent Application No. 10-2021-0114551, filed on Aug. 30, 2021, in the Korean Intellectual Property Office, the entire contents of which are incorporated herein by reference in their entirety.

BACKGROUND

Technical Field

Embodiments of the present disclosure relate to a steer by wire type steering apparatus, and more particularly, to a steer by wire type steering apparatus capable of mechanically stopping the steering wheel from rotating further when the rotation of the vehicle wheel reaches its maximum point.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

Therefore, when the rotation of the vehicle wheel reaches its maximum point (when the steering wheel or the vehicle wheel is in a full-turn state in a general steering system), there is a need for research to prevent the steering wheel from rotating any more.

SUMMARY

Embodiments of the present disclosure provide a steer by wire type steering apparatus capable of increasing a driver's steering feel and steering stability by preventing the steering wheel from mechanically rotating any more when the rotation of the vehicle wheel reaches the maximum point.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise an output shaft having an outer screw portion provided on an outer circumferential surface and having fixing grooves provided on both sides of the outer screw portion, a moving member having an inner screw portion coupled to the outer screw portion formed on an inner circumferential surface and provided with a guide portion protruding in a radial direction on an outer circumferential surface, a pair of guide stoppers having both ends in the axial direction supported by the outer circumferential surface of the output shaft and the fixing grooves, and provided with a guide groove on an inner surface of which the guide portion is inserted and supported, and provided with an outer protrusion protruding in a radial direction on an outer surface, an elastic ring coupled to one end and another end of the guide stoppers to elastically support the guide stoppers in a radial direction, and a housing provided with support protrusions for supporting both sides of the outer protrusion on an inner circumferential surface.

According to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
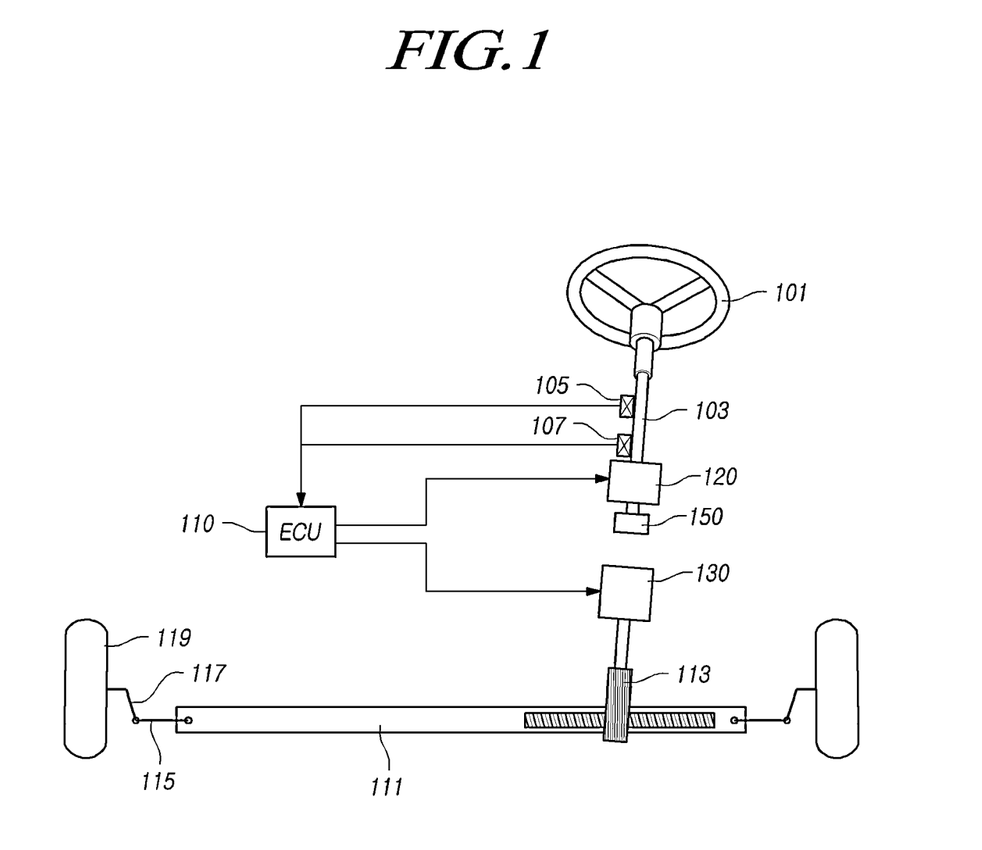
FIG. 1 is a schematic view illustrating a steer by wire type steering apparatus according to the embodiments of the present disclosure.
Figure 2:
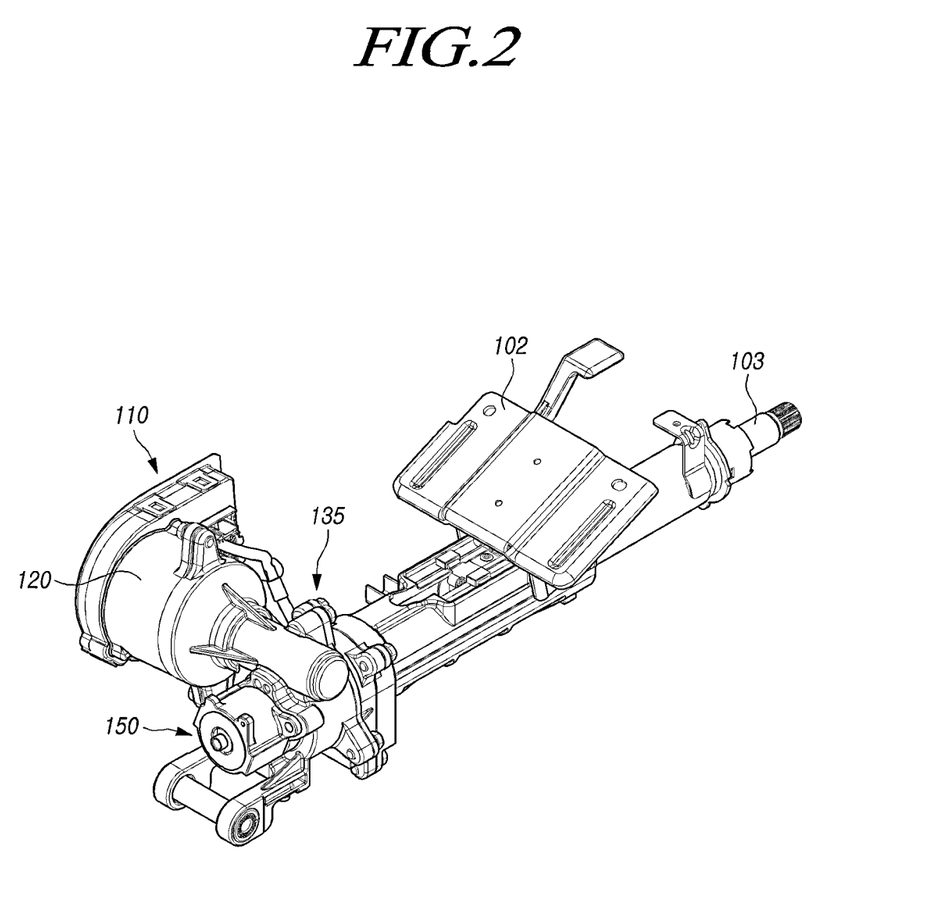
FIG. 2 is a perspective view illustrating a steer by wire type steering apparatus according to the embodiments of the present disclosure.
Figure 3:
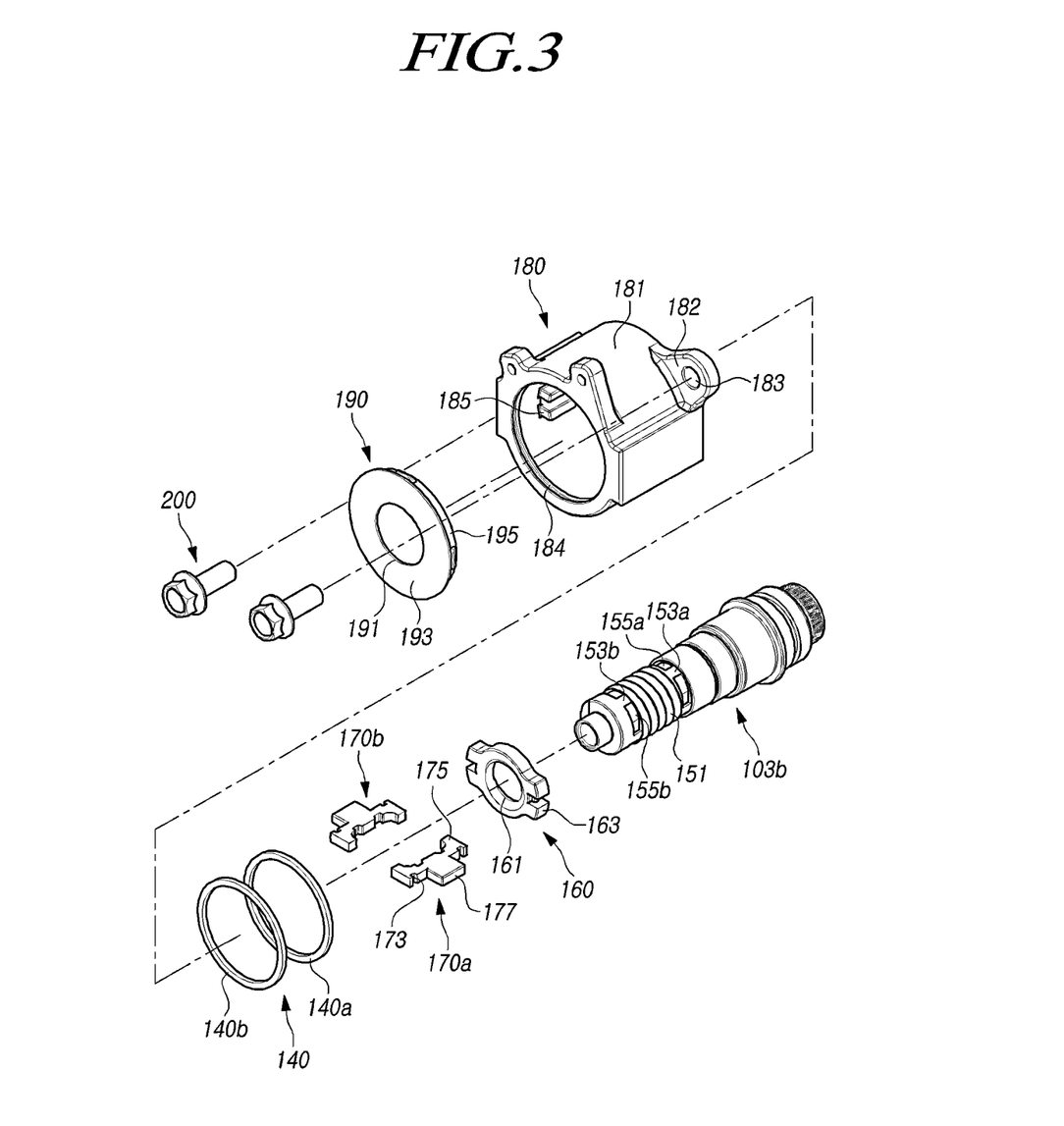
FIGS. 3 and 4 are exploded perspective views illustrating a steer by wire type steering apparatus according to the embodiments of the present disclosure.
Figure 4:
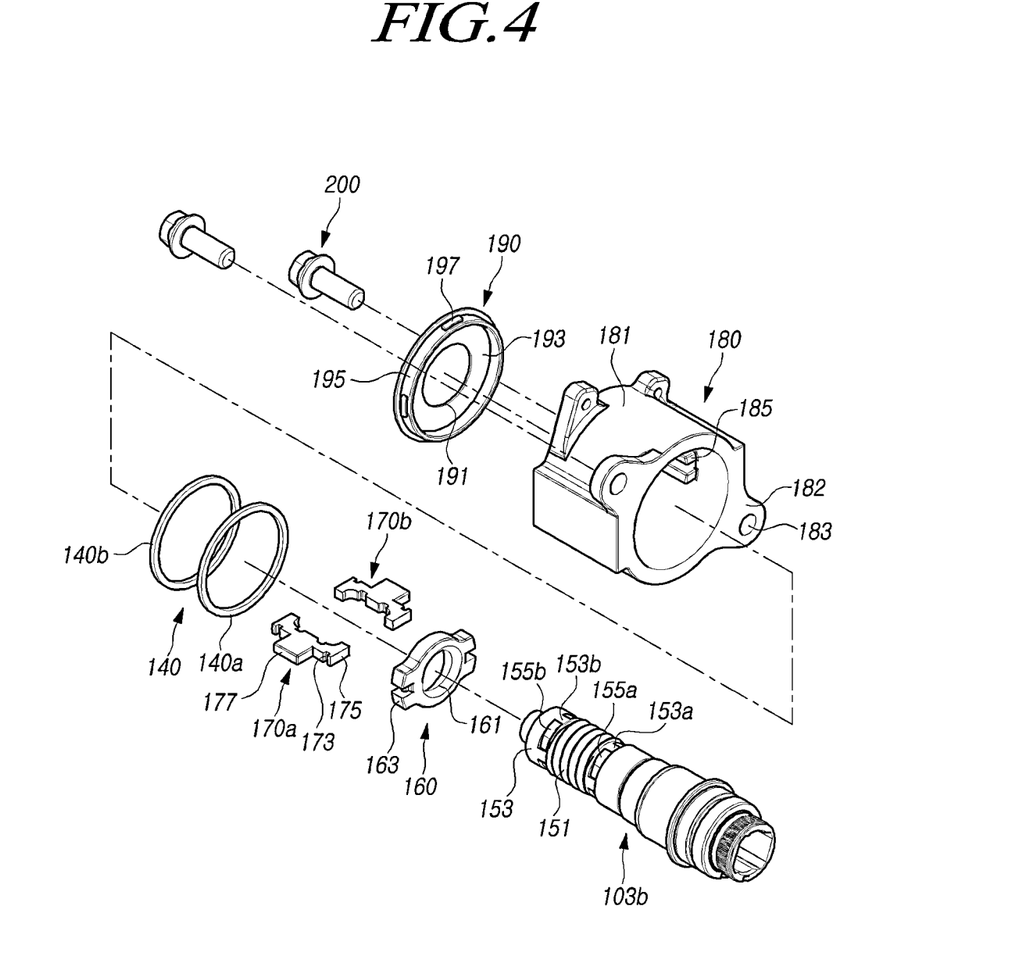
Figure 5:
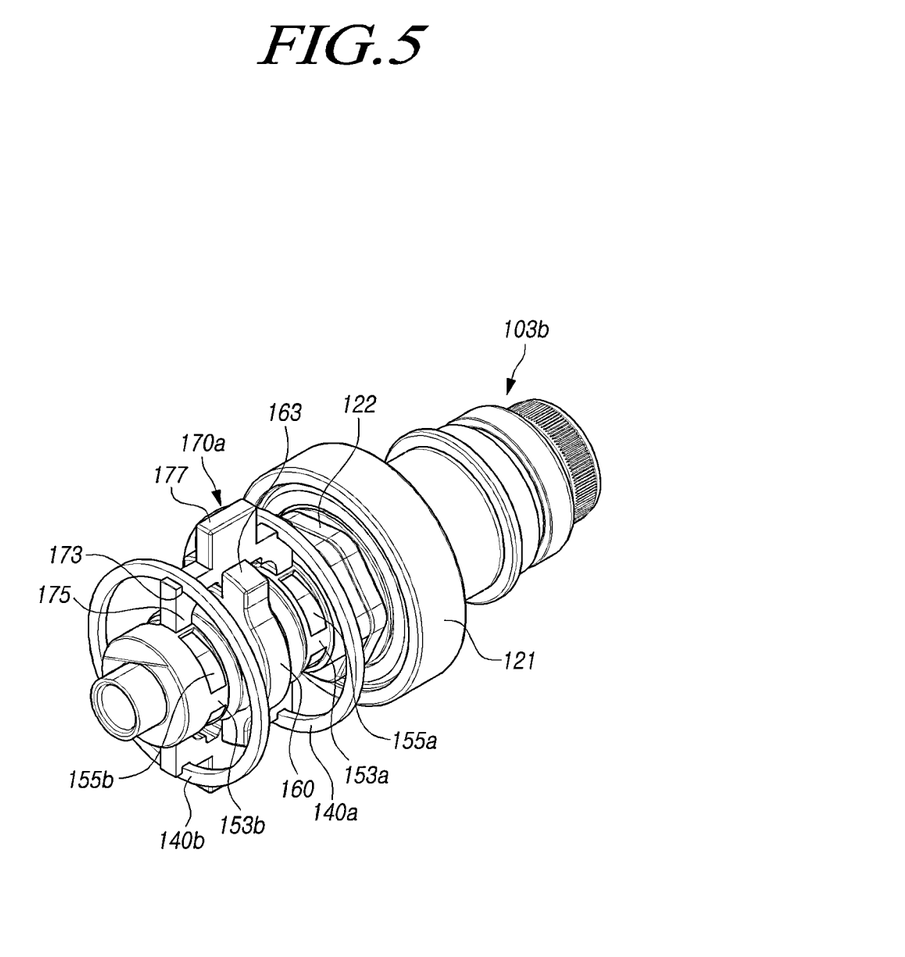
FIGS. 5 and 6 are a perspective view illustrating a steer by wire type steering apparatus according to the embodiments of the present disclosure.
Figure 6:
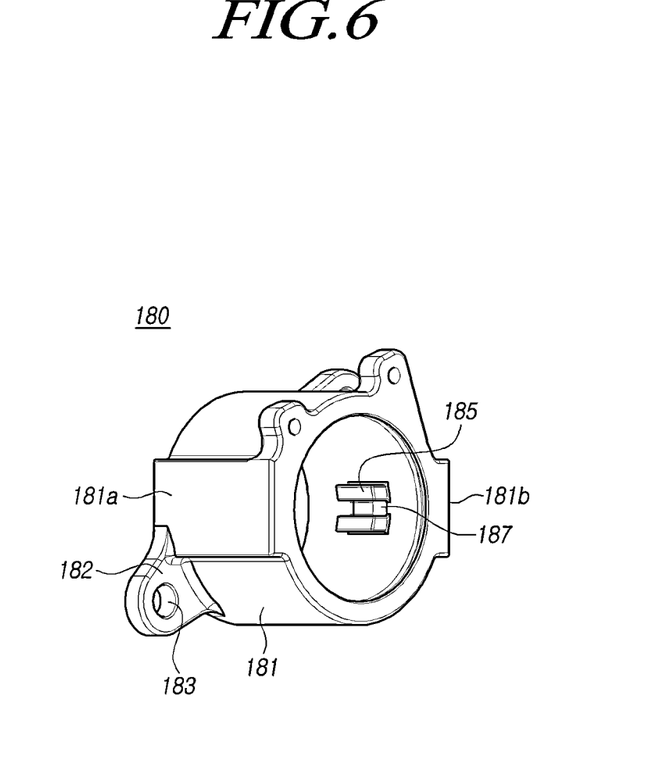
Figure 7:
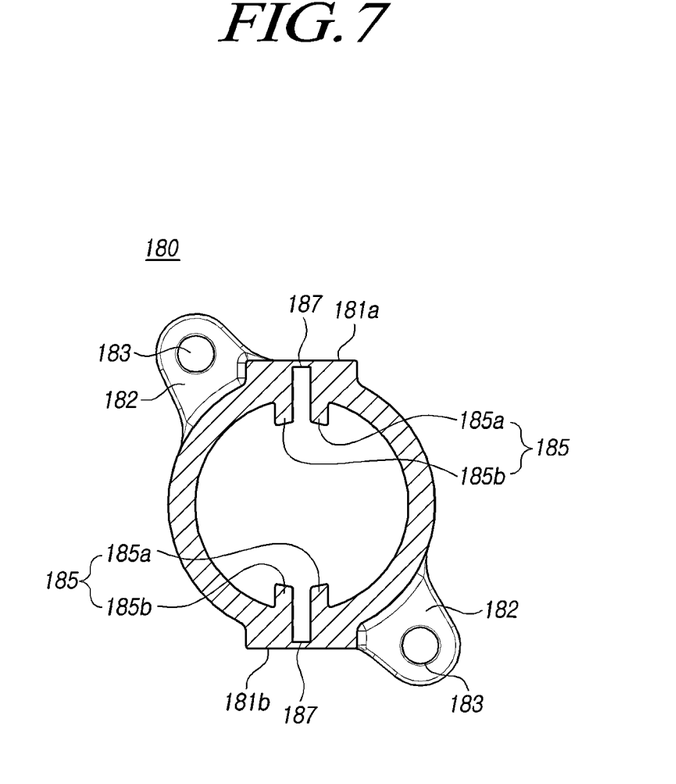
FIG. 7 is a partial cross-sectional view illustrating a steer by wire type steering apparatus according to the embodiments of the present disclosure.
Figure 8:
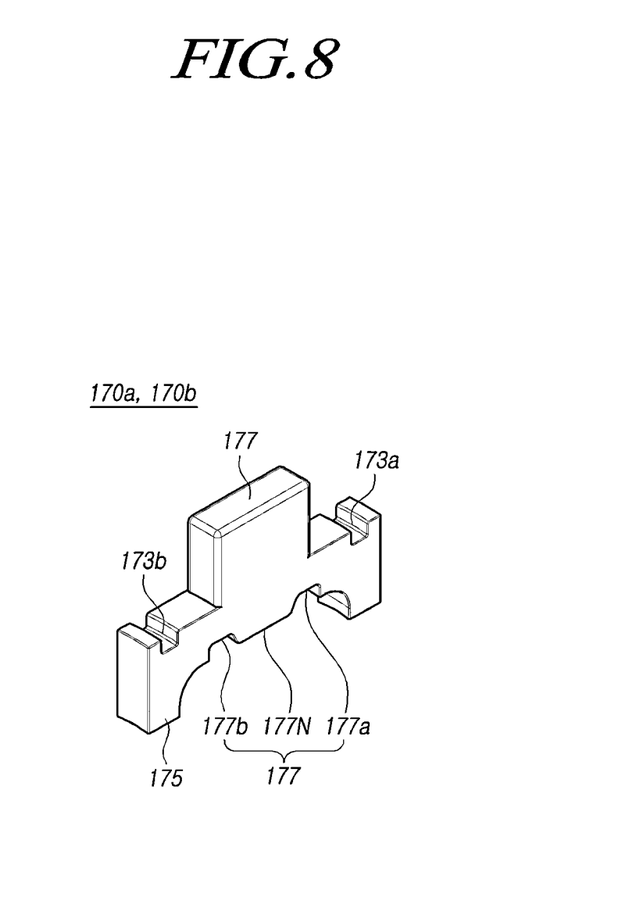
FIGS. 8 to 10 are perspective views illustrating a steer by wire type steering apparatus according to the embodiments of the present disclosure.
Figure 9:
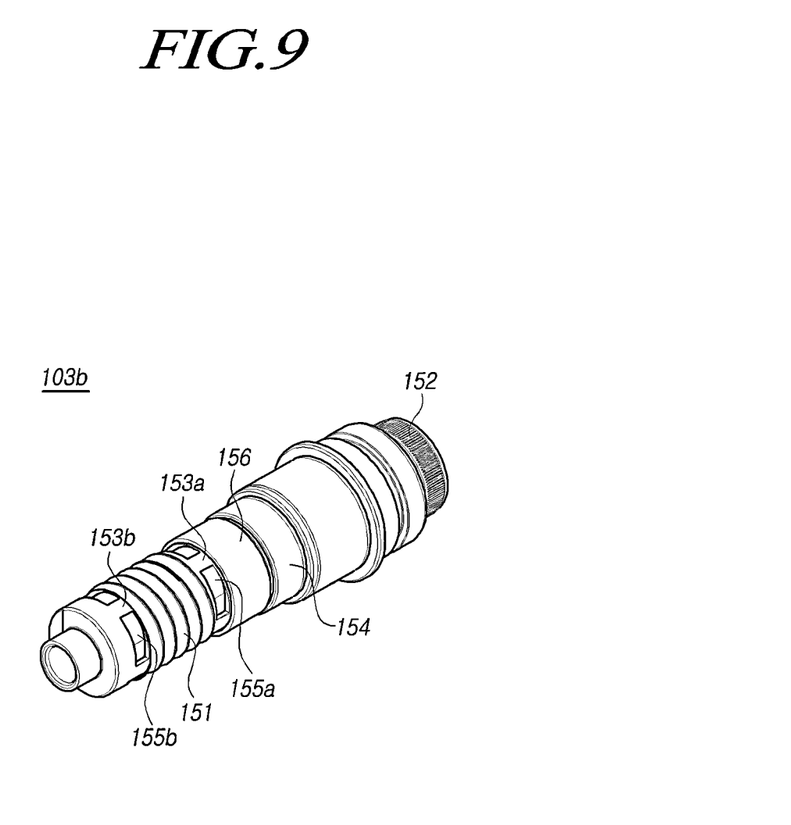
Figure 10:
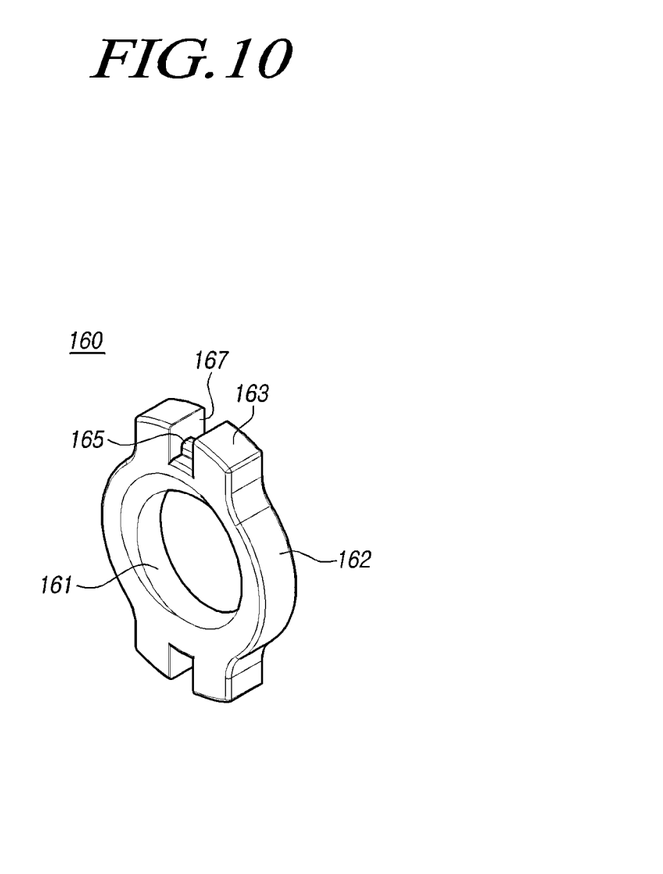
Figure 11:
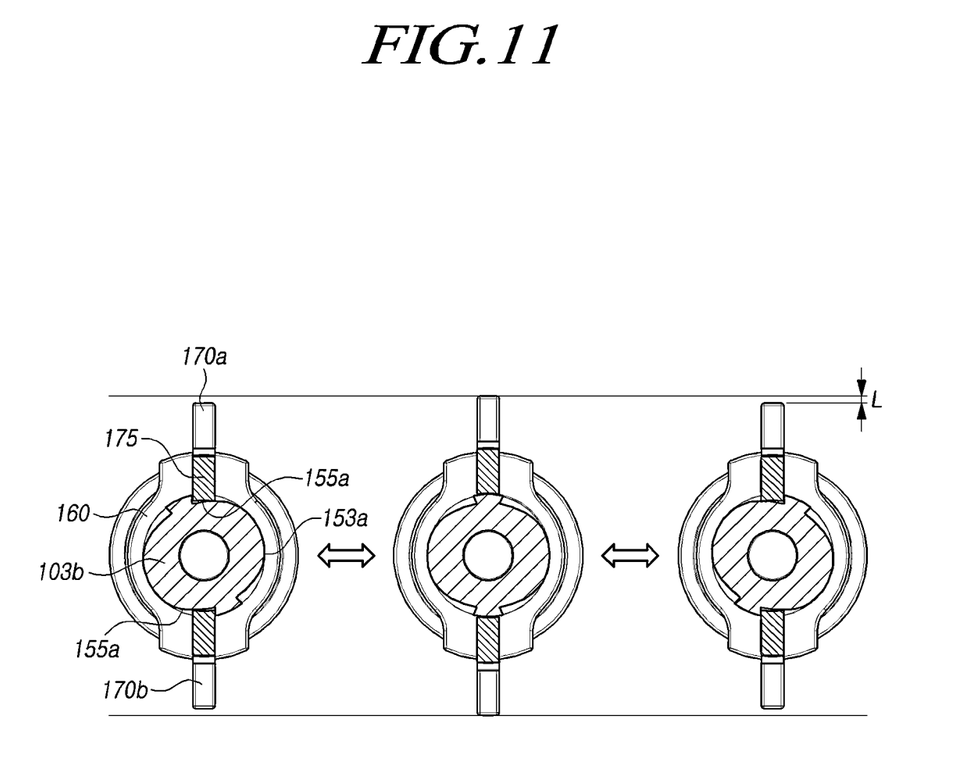
FIG. 11 is a front view illustrating a steer by wire type steering apparatus according to the embodiments of the present disclosure.
Figure 12:
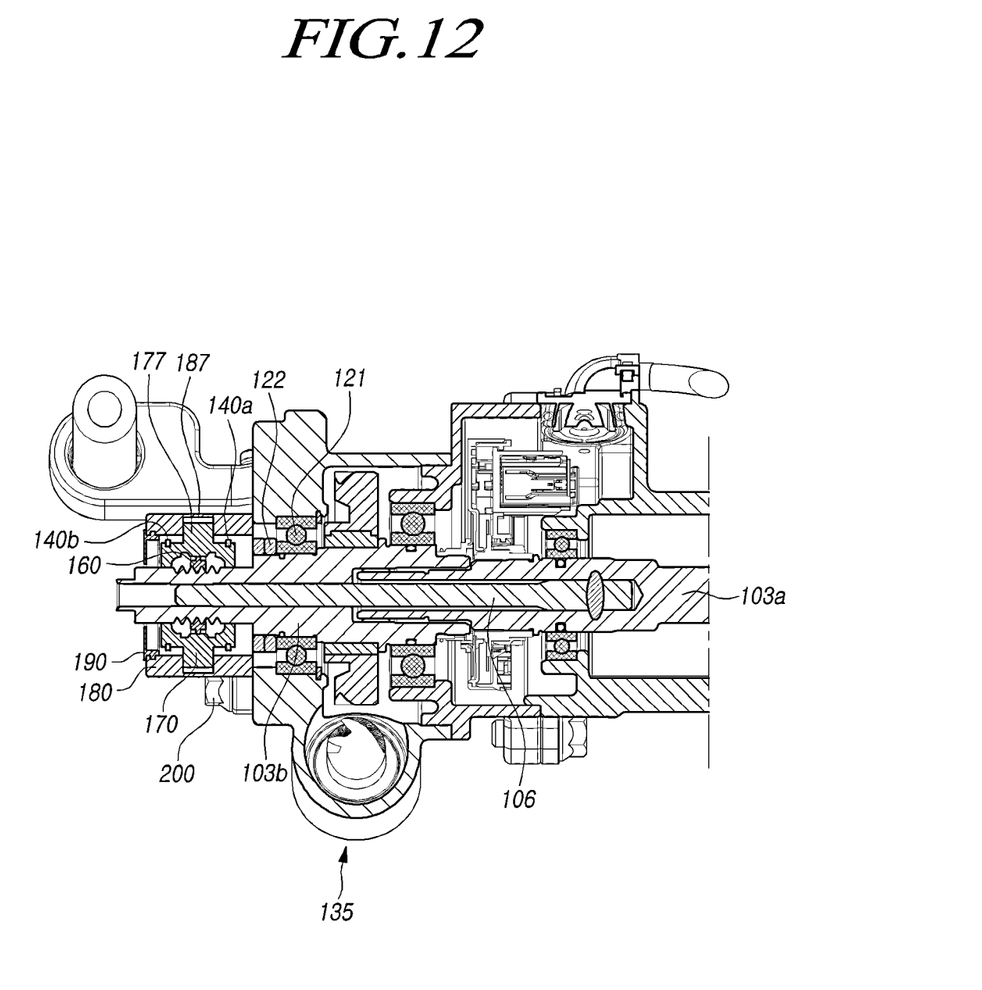
FIG. 12 is a cross-sectional view illustrating a steer by wire type steering apparatus according to the embodiments of the present disclosure.

FIG. 1 is a schematic view illustrating a steer by wire type steering apparatus according to the embodiments of the present disclosure; FIG. 2 is a perspective view illustrating a steer by wire type steering apparatus according to the embodiments of the present disclosure; FIGS. 3 and 4 are exploded perspective views illustrating a steer by wire type steering apparatus according to the embodiments of the present disclosure; FIGS. 5 and 6 are a perspective view illustrating a steer by wire type steering apparatus according to the embodiments of the present disclosure; FIG. 7 is a partial cross-sectional view illustrating a steer by wire type steering apparatus according to the embodiments of the present disclosure; FIGS. 8 to 10 are perspective views illustrating a steer by wire type steering apparatus according to the embodiments of the present disclosure; FIG. 11 is a front view illustrating a steer by wire type steering apparatus according to the embodiments of the present disclosure; FIG. 12 is a cross-sectional view illustrating a steer by wire type steering apparatus according to the embodiments of the present disclosure.

Referring to FIGS. 1 to 12, a steer by wire type steering apparatus according to the embodiments of the present disclosure may include an output shaft 103b having an outer screw portion 151 provided on an outer circumferential surface and having fixing grooves 155a and 155b provided on both sides of the outer screw portion 151, a moving member 160 having an inner screw portion 161 coupled to the outer screw portion 151 formed on an inner circumferential surface and provided with a guide portion 163 protruding in a radial direction on an outer circumferential surface, a pair of guide stoppers 170a and 170b having both ends in the axial direction supported by the outer circumferential surface of the output shaft 103b and the fixing grooves 155a and 155b, and provided with a guide groove 177 on an inner surface of which the guide portion 163 is inserted and supported, and provided with an outer protrusion 177 protruding in a radial direction on an outer surface, an elastic ring 140 coupled to one end and another end of the guide stoppers 170a and 170b to elastically support the guide stoppers 170a and 170b in a radial direction, and a housing 180 provided with support protrusions 185 for supporting both sides of the outer protrusion 177 on an inner circumferential surface.

First, referring to FIG. 1, in the steer by wire type steering apparatus according to the present embodiments, an angle sensor 105 and a torque sensor 107 are coupled to one side of the steering shaft 103 connected to the steering wheel 101. When the driver manipulates the steering wheel 101, the angle sensor 105 and the torque sensor 107 that sense it send an electric signal to the electronic control device 110 so that the steering shaft motor 120 and the pinion shaft motor 130 are operated.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the vehicle wheels 119 on both sides through the tie rod 115 and the knuckle arm 117.

However, in the drawings in the embodiments of the present disclosure, for convenience of explanation, as an example, the angle sensor 105 and the torque sensor 107 are provided on the steering shaft 103, but a vehicle speed sensor and a motor position sensor for transmitting steering information to the electronic control device 110, various radars, lidar, and image sensors such as cameras may be provided, and a detailed description thereof will be omitted below.

In such a steer by wire type steering apparatus, since the steering wheel 101 and the vehicle wheel 119 are not mechanically connected, when the driver manipulates the steering wheel 101, a mechanical restriction is required to stop the rotation of the steering wheel 101 at a certain angle.

That is, when the rotation of the vehicle wheel 119 reaches the maximum point (in a general steering device, when the steering wheel 101 or the vehicle wheel 119 is in a full-turn state), a rotation angle limiting member 150 for mechanically limiting the rotation angle of the steering shaft 103 is provided so that the steering wheel 101 is not rotated any more. Thus, it provides the driver with an accurate steering feeling.

The rotation angle limiting member 150 may include an output shaft 103b provided at a lower end of a steering column 100 which rotates in conjunction with the steering shaft 103 and is coupled to the vehicle body via the mounting bracket 102, a moving member 160 that moves in the axial direction when the output shaft 103b rotates, a pair of guide stoppers 170a and 170b for guiding the axial movement of the moving member 160, an elastic ring 140 for elastically supporting the guide stoppers 170a and 170b in a radial direction, and a housing 180 in which the moving member 160, guide stoppers 170a and 170b, and the elastic ring 140 are embedded and provided with support protrusions 185 for supporting both sides of the outer protrusion 177 on the inner circumferential surface.

The output shaft 103b, which rotates in conjunction with the steering shaft 103, has an outer screw portion 151 formed on an outer circumferential surface thereof. Fixing grooves 155a and 155b are formed on both sides of the outer screw portion 151, and the moving member 160 is coupled to the outer circumferential side of the output shaft 103b to move in the axial direction.

The moving member 160 is coupled to the outer circumferential side of the output shaft 103b, and an inner screw portion 161 corresponding to the outer screw portion 151 of the output shaft 103b is formed on the inner circumferential surface. A guide portion 163 protruding in a radial direction is formed on the outer circumferential surface of the moving member 160 so that it is moved in the axial direction while being supported by the guide stoppers 170a and 170b when the output shaft 103b rotates.

The guide stoppers 170a and 170b are provided as a pair, and both ends in the axial direction are supported by the outer peripheral surface and the fixing grooves 155a and 155b of the output shaft 103b located on both sides of the outer screw portion 151.

A guide groove 177 into which the guide portion 163 of the moving member 160 is inserted and supported is provided on the inner surface of the guide stoppers 170a and 170b. An outer protrusion 177 radially protrudes from the outer surface of the guide stoppers 170a and 170b to guide the axial movement of the moving member 160.

Each of the elastic rings 140a and 140b is coupled to one end and the other end of the guide stoppers 170a and 170b. Accordingly, the elastic rings 140a and 140b elastically support the guide stoppers 170a and 170b in the radial direction so as to be in close contact with the outer peripheral surface of the output shaft 103b and the fixing grooves 155a and 155b.

A housing 180 provided with support protrusions 185 for supporting both sides of the outer protrusion 177 on the inner circumferential surface is coupled to the reducer 135 provided under the steering column, and a housing cover 190 is coupled to the end of the housing 180.

The fixing grooves 155a and 155b formed on both sides of the outer screw portion 151 of the output shaft 103b are provided on the outer circumferential surface of the outer screw portion 151 and axially spaced apart and supported by guide stoppers 170a and 170b.

The fixing grooves 155a and 155b are respectively provided on both sides in the circumferential direction with respect to each of the outer reference portions 153a and 153b formed at radially symmetrical positions on the outer peripheral surface of the output shaft 103b.

The outer reference portions 153a and 153b are provided on both sides of the outer screw portion 151. Each of the outer reference portions 153a and 153b is disposed at a position of 180° in the circumferential direction with respect to the central axis of the output shaft 103b, and a pair of fixing grooves 155a and 155b are provided on both sides of the outer reference portions 153a and 153b in the circumferential direction, respectively.

That is, on the outer peripheral surface of one end of the output shaft 103b in the axial direction, four fixing grooves 155a are arranged to be spaced apart from each other in the circumferential direction based on the two outer reference portions 153a.

And, on the outer peripheral surface of the other end of the axial direction of the output shaft 103b, four fixing grooves 155b are arranged to be spaced apart from each other in the circumferential direction based on the two outer reference portions 153b.

In addition, the fixing grooves 155a and 155b are formed to gradually deepen toward both sides in the circumferential direction in the outer reference portions 153a and 153b. Therefore, when the output shaft 103b rotates in one direction and the other, the depth of the fixing grooves 155a and 155b in which the guide stoppers 170a and 170b are supported changes.

Accordingly, the guide stoppers 170a and 170b are supported by the fixing grooves 155a and 155b while moving in the radial direction to stop the rotation of the output shaft 103b, so that the rotation angle is limited.

Support ends 175 supported by the outer reference portions 153a and 153b of the output shaft 103b and the fixing grooves 155a and 155b are provided at both ends of the guide stoppers 170a and 170b in the axial direction.

In addition, the guide groove 177 into which the guide portion 163 of the moving member 160 is inserted and supported is provided on the inner surface between the support ends 175.

In addition, each of the guide stoppers 170a and 170b is provided with a coupling groove 173 to which the elastic ring 140 is coupled to the upper ends of the support ends 175 to prevent separation during operation.

And, when the output shaft 103b is rotated, by the elastic tightening force of the elastic ring 140, the support ends 175 are supported in close contact with the outer reference portions 153a and 153b and the fixing grooves 155a and 155b, and are moved in the radial direction.

Accordingly, the rotation angle is limited by stopping the rotation of the output shaft 103b as described above.

One or more elastic ring 140 may be provided. In embodiments of the present disclosure, the coupling groove 173 is provided at the upper end of each of the support ends 175, and the elastic ring 140 is shown as an example provided as a pair coupled to each of the coupling grooves 173a, 173b.

The guide groove 177 formed on the inner surfaces of the guide stoppers 170a and 170b may include a pair of first guide grooves 177a and 177b spaced apart in the axial direction, and a second guide groove 177N protruding radially inward than the first guide grooves 177a and 177b and disposed between the first guide grooves 177a and 177b.

The second guide groove 177N is formed in a plane parallel to the axial direction, the first guide grooves 177a and 177b provided on both sides of the second guide groove 177N are formed to have a greater depth radially outward than the second guide groove 177N.

Here, the moving member 160 is provided with a guide portion 163 at a position symmetrically up and down in the radial direction, and is supported by the first guide grooves 177a and 177b and the second guide grooves 177N. And as the moving member 160 moves in the axial direction, the radial positions of the guide stoppers 170a and 170b are determined.

The guide portion 163 is provided with a cut-out 167 penetrating in the axial direction, so that the guide stoppers 170a and 170b are inserted into the cut-out 167 and coupled in the axial direction.

Accordingly, when the output shaft 103b rotates, the moving member 160 does not rotate but is supported by the guide stoppers 170a and 170b and moves in the axial direction.

The cutout 167 is provided with a guide protrusion 165 that is inserted into and coupled to the first guide grooves 177a and 177b when the moving member 160 is moved to restrict the axial movement of the moving member 160, so that an axial movement distance of the moving member 160 is limited.

The guide protrusion 165 has an outer circumferential surface located on the inner side than the outer circumferential surface of the guide part 163, and is located on the inner side of one side and the other side in the axial direction of the moving member 160. Therefore, the guide protrusion 165 is supported by the first guide grooves 177a and 177b, and movement in the axial direction is limited.

Accordingly, when the guide protrusion 165 reaches a position supported by the first guide grooves 177a and 177b, the support ends 175 of the guide stoppers 170a and 170b are inserted into the fixing grooves 155a and 155b of the output shaft 103b to stop the output shaft 103b from rotating.

Referring to FIG. 11 together with FIG. 8 for a process in which the rotation of the output shaft 103b is limited, the left view of FIG. 11 shows a state in which the support ends 175 of the guide stoppers 170a and 170b are inserted into the fixing grooves 155a of the output shaft 103b to stop the rotation of the output shaft 103b.

At this time, the moving member 160 is at a position where the guide protrusion 165 is inserted into the first guide groove 177a, and the guide stoppers 170a and 170b are positioned radially inwardly by the depth L of the fixing grooves 155a.

After that, when the output shaft 103b rotates counterclockwise, the support ends 175 come out of the fixing grooves 155a and move to the outer peripheral surface of the output shaft 103b. At the same time, the guide protrusion 165 also comes out of the first guide groove 177a and moves to the second guide groove 177N, so that the guide stoppers 170a and 170b move radially outward as shown in the middle view of FIG. 11.

After that, when the output shaft 103b is further rotated counterclockwise, the rotation of the output shaft 103b is stopped while the support ends 175 are again inserted into the fixing grooves 155a. And the guide stoppers 170a and 170b are moved radially inward by the depth L of the fixing grooves 155a.

That is, the left view of FIG. 11 shows a state in which the guide protrusion 165 is inserted into the first guide groove 177a on one side in the axial direction, the middle view of FIG. 11 shows a state in which the guide protrusion 165 moves along the second guide groove 177N. And the right view of FIG. 11 shows a state in which the guide protrusion 165 is inserted into the other first guide grooves 177b in the axial direction.

In addition, the left and right views of FIG. 11 show a state in which the guide stoppers 170a and 170b are moved radially inward by the depth L of the fixing grooves 155a, the middle view of FIG. 11 shows a state in which the guide stoppers 170a and 170b are moved to the outermost in the radial direction.

In this way, when the moving member 160 moves from one side of the output shaft 103b to the other side, the guide stoppers 170a and 170b move radially as much as the depth L of the fixing grooves 155a in the output shaft 103b and the rotation angle is limited.

The housing 180 includes a cylindrical body 181 in which a moving member 160, guide stoppers 170a and 170b, and an elastic ring 140 are embedded, and opening hole 184 is formed at both ends of the cylindrical body 181.

A fastening flange 182 having a fastening hole 183 is provided at one end of the housing 180 and is coupled to the reducer 135 provided at the lower portion of the steering column by the fastening member 200.

The support protrusions 185 formed on the inner circumferential surface of the housing 180 are formed as a pair of bulkheads 185a and 185b that are spaced apart in the circumferential direction and arranged in parallel in the radial direction, so that both sides of the outer protrusions 177 of the guide stoppers 170a and 170b are supported and rotation in the axial direction is prevented.

The support protrusions 185 are provided at radially symmetrical positions on the inner circumferential surface of the housing 180 to support the outer protrusions 177 in the vertical direction of the guide stoppers 170a and 170b.

The housing 180 is provided with protruding outer peripheral portions 181a and 181b that are formed to protrude in the radial direction from the outer peripheral surface of the position where the support protrusions 185 are provided. A receiving groove 187 through which the outer protrusion 177 can move vertically in the radial direction is formed between the bulkheads of the support protrusions 185 arranged parallel to each other in the protruding outer peripheral portions 181a and 181b.

Accordingly, when the moving member 160 is moved in the axial direction, the guide stoppers 170a and 170b can be moved up and down in the radial direction in the receiving groove 187 and rotation of the guide stoppers 170a and 170b is prevented.

On the other hand, the opening hole 184 provided at the end of the housing 180 is coupled to the housing cover 190 through which the output shaft 103b penetrates. The moving member 160, the guide stoppers 170a and 170b, the elastic ring 140, etc. built in therein can be protected without being exposed to the outside.

The housing cover 190 may include a cylinder portion 195 inserted into the opening hole 184 and provided with an elastic protrusion 197 on an outer circumferential surface, and a support portion 193 extending in a radial direction from an end of the cylinder portion 195 and closely supported on an end of the housing 180.

The cylinder portion 195 protrudes in a cylindrical shape and is inserted into the opening hole 184 of the housing 180, and a plurality of elastic protrusions 197 formed on the outer peripheral surface are elastically deformed to the inner peripheral surface of the opening hole 184 and are closely coupled.

A through hole 191 through which the output shaft 103b passes is formed in the support 193, when the cylinder portion 195 is inserted into the opening hole 184, the inner surface of the support portion 193 is closely supported and coupled to the end of the housing 180 so that it is not exposed to the outside except for the through hole 191.

The steering shaft 103 includes the output shaft 103b connected to the input shaft 103a, and the input shaft 103a and the output shaft 103b are coupled via a torsion bar 106.

Accordingly, when the steering shaft 103 is rotated, the output shaft 103b connected to the input shaft 103a is interlocked and rotates.

A bearing 121 for supporting the rotation of the output shaft 103b is coupled between the outer peripheral surface of the output shaft 103b and the inner peripheral surface of the housing of the reducer 135. A fixing member 122 for supporting the bearing 121 in the axial direction is coupled to the outer circumferential surface of the output shaft 103b to prevent separation.

As described above, according to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
an output shaft having an outer screw portion provided on an outer circumferential surface of the output shaft and having fixing grooves provided on both sides of the outer screw portion;
a moving member having an inner screw portion coupled to the outer screw portion formed on an inner circumferential surface of the moving member and provided with a guide portion protruding in a radial direction on an outer circumferential surface of the moving member;
a pair of guide stoppers having both ends in the axial direction supported by the outer circumferential surface of the output shaft and the fixing grooves, and provided with a guide groove on an inner surface of the guide stoppers of which the guide portion is inserted and supported, and provided with an outer protrusion protruding in a radial direction on an outer surface of the guide stoppers;
an elastic ring coupled to one end and another end of the guide stoppers to elastically support the guide stoppers in a radial direction; and
a housing provided with support protrusions for supporting both sides of the outer protrusion on an inner circumferential surface,
wherein the fixing grooves are respectively provided on both sides in a circumferential direction with respect to each of outer reference portions formed at radially symmetrical positions on the outer circumferential surface of the output shaft, and
wherein the fixing grooves are formed to become deeper in depth toward both sides in the circumferential direction from the outer reference portions of the outer circumferential surface.

2. The steer by wire type steering apparatus of claim 1, wherein the fixing grooves are provided on the outer circumferential surface of the output shaft of a position spaced apart from the outer screw portion in the axial direction.

3. The steer by wire type steering apparatus of claim 1, wherein the guide stoppers are provided with support ends supported by the outer reference portions and the fixing grooves at both ends in the axial direction, and the guide groove is provided on the inner surface of the guide stoppers between the support ends.

4. The steer by wire type steering apparatus of claim 3, wherein each of the guide stoppers is provided with a coupling groove to which the elastic ring is coupled to an upper end of the support ends.

5. The steer by wire type steering apparatus of claim 4, wherein the coupling groove is provided at an upper end of each of the support ends, and the elastic ring is provided as a pair coupled to the coupling groove.

6. The steer by wire type steering apparatus of claim 3, wherein the guide groove comprises:
a pair of first guide grooves spaced apart in the axial direction; and
a second guide groove protruding radially inward than the first guide grooves and disposed between the first guide grooves.

7. The steer by wire type steering apparatus of claim 6, wherein the moving member is provided with the guide portion at a position symmetrically up and down in the radial direction, supported by the first guide grooves and the second guide groove, and moves in the axial direction.

8. The steer by wire type steering apparatus of claim 7, wherein the guide portion is provided with a cut-out penetrating in the axial direction, and the guide stoppers are inserted into the cut-out portion and coupled in the axial direction.

9. The steer by wire type steering apparatus of claim 8, wherein the cut-out is provided with a guide protrusion that is inserted into the first guide grooves to limit the axial movement of the moving member.

10. The steer by wire type steering apparatus of claim 9, wherein an outer circumferential surface of the guide protrusion is located on an inner side than an outer circumferential surface of the guide portion and is located inside of one side and another side of the moving member in the axial direction.

11. The steer by wire type steering apparatus of claim 7, wherein the support protrusions are spaced apart from an inner circumferential surface of the housing in the circumferential direction and are formed as a pair of bulkheads arranged in parallel in the radial direction, so that both sides of the outer protrusion are supported.

12. The steer by wire type steering apparatus of claim 11, wherein the support protrusions are provided at positions symmetrically up and down in the radial direction on the inner circumferential surface of the housing.

13. The steer by wire type steering apparatus of claim 11, wherein the housing is provided with a protruding outer peripheral portion formed to protrude in the radial direction on an outer peripheral surface of a position where the support protrusions are provided.

14. The steer by wire type steering apparatus of claim 13, wherein a receiving groove through which the outer protrusion of the guide stoppers can move up and down in a radial direction is formed between the bulkheads of the support protrusions arranged in parallel to each other.

15. The steer by wire type steering apparatus of claim 1, wherein the housing includes a cylindrical body in which the moving member, guide stoppers, and the elastic ring are embedded, an opening hole is provided at an end of the body, and a housing cover through which the output shaft passes is coupled to the opening hole.

16. The steer by wire type steering apparatus of claim 15, wherein the housing cover comprises:
- a cylinder portion inserted into the opening hole and provided with an elastic protrusion on an outer circumferential surface of the cylinder portion; and
- a support portion extending in a radial direction from an end of the cylinder portion and closely supported on an end of the housing.

17. The steer by wire type steering apparatus of claim 16, wherein the cylinder portion protrudes in a cylindrical shape and is inserted into the opening hole of the housing, and the elastic protrusion is elastically deformed and closely coupled to an inner circumferential surface of the opening hole.

18. The steer by wire type steering apparatus of claim 16, wherein a through hole is formed in the support portion to allow the output shaft to pass therethrough, and when the cylinder portion is inserted into the opening hole, an inner surface of the support portion is closely supported and coupled to an end of the housing.

* * * * *